United States Patent
Sarda

(10) Patent No.: US 7,418,528 B2
(45) Date of Patent: Aug. 26, 2008

(54) MULTIMODE, MULTILINE DATA TRANSFER SYSTEM AND METHOD OF OPERATING THE SAME

(75) Inventor: Vivek Sarda, Austin, TX (US)

(73) Assignee: Texas Instruments Incorporated, Dallas, TX (US)

( * ) Notice: Subject to any disclaimer, the term of this patent is extended or adjusted under 35 U.S.C. 154(b) by 527 days.

(21) Appl. No.: 10/897,130

(22) Filed: Jul. 22, 2004

(65) Prior Publication Data

US 2006/0020733 A1    Jan. 26, 2006

(51) Int. Cl.
*G06F 3/00* (2006.01)
(52) U.S. Cl. .............. 710/11; 710/9; 710/10; 710/14
(58) Field of Classification Search .............. None
See application file for complete search history.

(56) References Cited

U.S. PATENT DOCUMENTS

| 6,253,268 | B1 * | 6/2001 | Bjorkengren et al. | 710/105 |
| 2002/0033757 | A1 * | 3/2002 | Rodgers et al. | 340/572.1 |
| 2003/0195969 | A1 * | 10/2003 | Neuman | 709/229 |
| 2004/0054821 | A1 * | 3/2004 | Warren et al. | 710/8 |

* cited by examiner

*Primary Examiner*—Alan Chen
(74) *Attorney, Agent, or Firm*—Ronald O. Neerings; Wade James Brady, III; Frederick J. Telecky, Jr.

(57) ABSTRACT

Multimode, multiline data transfer systems and methods of operating the same. In one embodiment, one system includes: (1) a bus interface for a bus, the bus interface having a start line driver, a clock line driver and a data line driver and (2) control circuitry coupled to the bus interface and configured to cause the start line driver to establish a selected one of plural data communication protocols over the bus, the clock line driver configured to serve as a further data line driver when the selected one is based on pulse-width modulation.

22 Claims, 5 Drawing Sheets

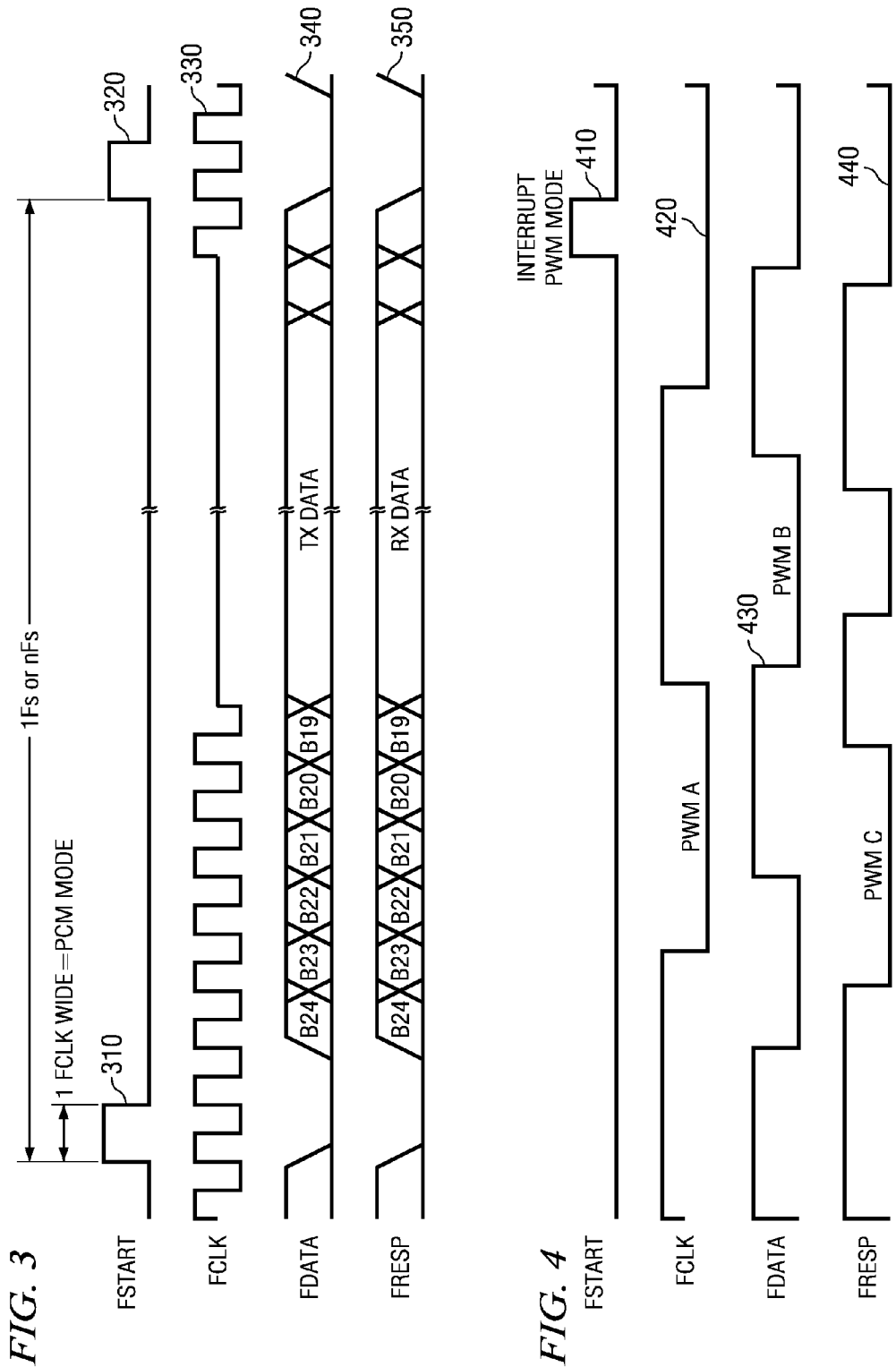

MULTIMODE, MULTILINE DATA TRANSFER SYSTEM AND METHOD OF OPERATING THE SAME

TECHNICAL FIELD OF THE INVENTION

The present invention is directed, in general, to data buses for digital data communication and, more specifically, to a multimode, multiline data transfer system and a method of operating the transfer system to effect flexible protocol data transfer.

BACKGROUND OF THE INVENTION

Modern electronic devices such as personal computers, personal digital assistants and cellphones are rarely, if ever, wholly designed and manufactured by one company. Instead, they are collections of functional modules (e.g., hard macros, integrated circuits or circuit boards) manufactured by different companies and made to work together by means of interconnecting buses. The buses allow data (analog or digital) and control signals to be communicated among the functional modules.

Currently, many different protocol standards govern the communication of data and control signals. Still other standards govern the physical configuration and operation of data and control buses and the bus management circuitry that uses them. Normally, standards are perceived as beneficial. They bring uniformity and compatibility to designs. However, standards are all too often developed without reference to potentially competing standards and may as a result be mutually incompatible.

It is often the case that functional modules from various companies to be brought together to form an electronic device adhere to different communication standards and are designed to use different standard buses and bus management circuitry. As a consequence, the electronic device is forced to accommodate multiple types of buses and associated bus management circuitry.

The effects of this accommodation are manifold and can be quite detrimental. First, at least some of the functional modules are forced to have more pins, which likely makes them physically larger. Second, designing of the electronic device is more difficult and thus requires more time. Third, circuit layout and bus routing become more complex and require more space ("real estate"). Fourth, the additional circuitry increases power consumption. Fifth, testing, fault isolation and debugging become more tedious. And sixth, the time required to initialize the electronic device for operation ("booting") is increased.

For these reasons, what is needed in the art is a better way to join functional modules adhering to disparate communication or bus standards.

SUMMARY OF THE INVENTION

To address the above-discussed deficiencies of the prior art, the present invention provides in one aspect, a multimode, multiline data transfer system. In one embodiment, the system includes: (1) a bus interface for a bus, the bus interface having a start line driver, a clock line driver and a data line driver and (2) control circuitry coupled to the bus interface and configured to cause the start line driver to establish a selected one of plural data communication protocols over the bus, the clock line driver configured to serve as a further data line driver when the selected one is based on pulse-width modulation.

In another aspect, the present invention provides a method of operating a multimode, multiline data transfer system. In one embodiment, the method includes: (1) employing a start line driver of a bus interface to establish a selected one of plural data communication protocols over a bus, the bus interface further having a clock line driver and a data line driver and (2) transferring data over the bus according to the selected one, the clock line driver configured to serve as a further data line driver when the selected one is based on pulse-width modulation.

The present invention also provides, in yet another aspect, a multimode, multiline data transfer system. In one embodiment, the system includes: (1) a bus having a start line, a clock line and a data line and (2) at least two functional blocks coupled to the bus, each of the at least two functional blocks including: (2a) a bus interface having a start line driver coupled to the start line, a clock line driver coupled to the clock line and a data line driver coupled to the data line and (2b) control circuitry coupled to the bus interface and configured to cause the start line driver to establish a selected one of plural data communication protocols over the bus, the clock line driver configured to serve as a further data line driver when the selected one is based on pulse-width modulation.

The foregoing has outlined preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention.

BRIEF DESCRIPTION OF THE DRAWINGS

For a more complete understanding of the present invention, reference is now made to the following descriptions taken in conjunction with the accompanying drawings, in which:

FIG. 3 illustrates a timing diagram pertaining to a pulse-code modulation (PCM) data communication protocol provided in one embodiment of the multimode, multiline data transfer system of FIG. 1;

FIG. 4 illustrates a timing diagram pertaining to a pulse-width modulation (PWM) data communication protocol provided in one embodiment of the multimode, multiline data transfer system of FIG. 1;

DETAILED DESCRIPTION

Figure 1:
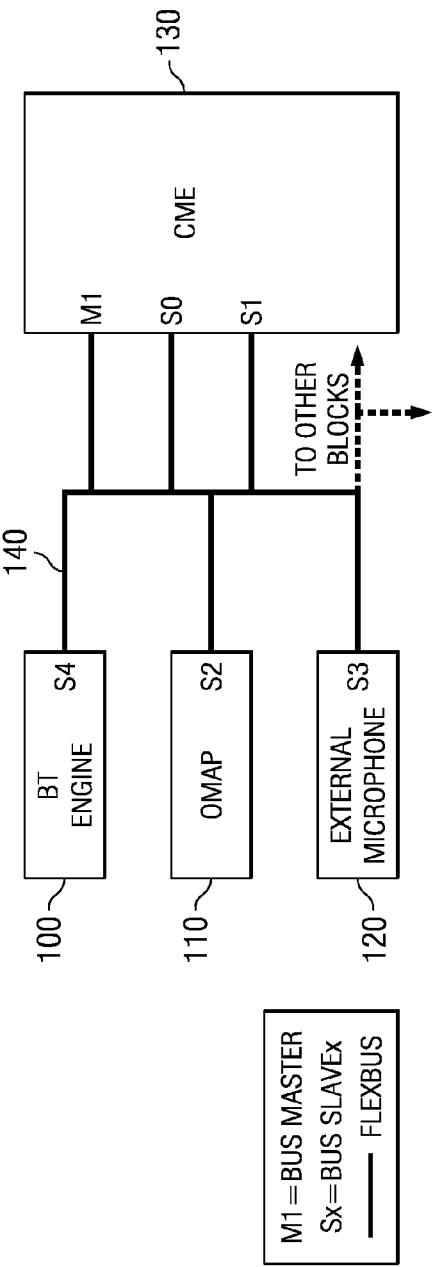
FIG. 1 illustrates a block diagram of a wireless communication device containing one embodiment of a multimode, multiline data transfer system constructed according to the principles of the present invention.

Referring initially to FIG. 1, illustrated is a block diagram of a wireless communication device containing one embodiment of a multimode, multiline data transfer system constructed according to the principles of the present invention.

FIG. 1 shows several functional blocks. One functional block is a Bluetooth engine 100 for effecting relatively short-range wireless communication. Those skilled in the art are familiar with the Bluetooth standard and commercially available circuitry for enabling communication according to the Bluetooth standard.

Another functional block is an Open Multimedia Application Platform (OMAP) processor 110. The OMAP processor 110 supports application programs which may be developed to execute within the wireless communication device. OMAP processors are commercially available from Texas Instruments, Inc. of Dallas, Tex.

Yet another functional block is an external microphone module 120. The external microphone module 120 is conventional and allows an external microphone to be attached to the wireless communication device.

Still another functional block is a communication/modem engine (CME) 130. The CME 130 is responsible for the basic radio functions of the wireless communication device, including managing the wireless communication device's air interface (not shown).

A bus 140 interconnects the Bluetooth engine 100, OMAP 110, external microphone module 120 and CME 130. The bus 140 is constructed according to the principles of the present invention and operates according to the timing diagrams presented hereinafter. The bus 140 is coupled to the Bluetooth engine 100 via a bus interface S4, which defaults as a slave. The bus 140 is coupled to the OMAP 110 via a bus interface S2, which defaults as a slave. The bus 140 is coupled to the external microphone module 130 via a bus interface S3, which defaults as a slave. Finally, the bus 140 is coupled to the CME 140 via a bus interface M1, which defaults as a bus master. In the illustrated embodiment, the bus interfaces S2, S3 and S4 are capable of acting as alternative bus masters. The bus 140 may be further coupled to other functional blocks (not shown) as may be desired.

Figure 2:
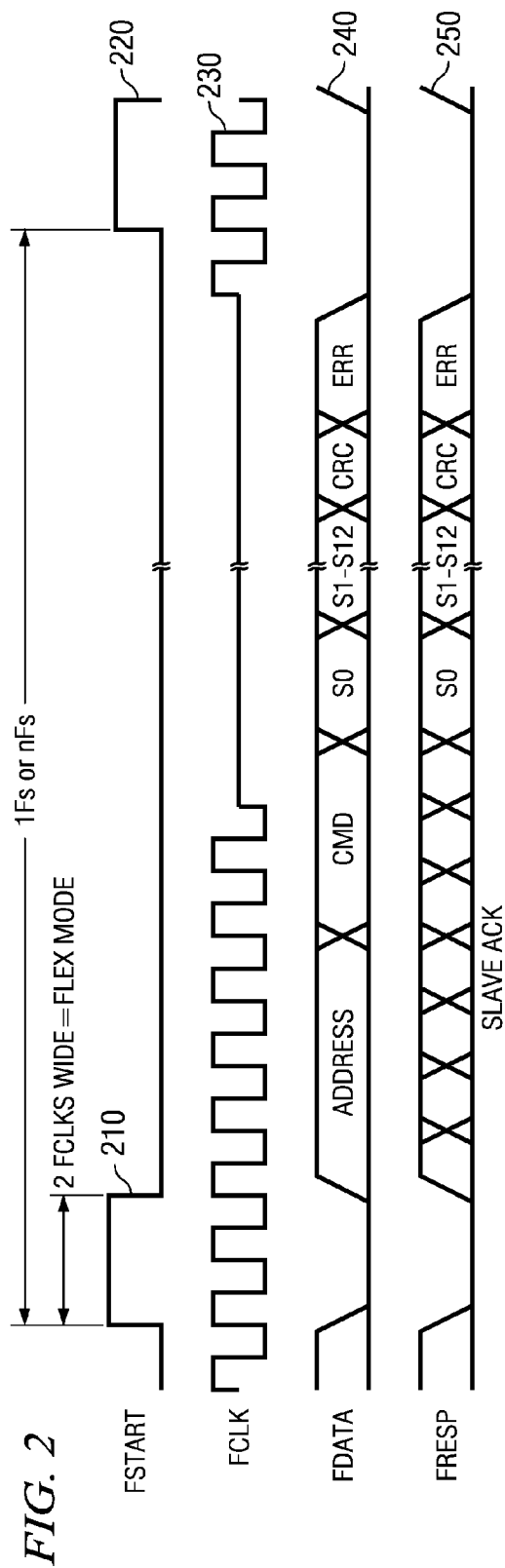
FIG. 2 illustrates a timing diagram pertaining to a flex data communication protocol provided in one embodiment of the multimode, multiline data transfer system of FIG. 1.

Turning now to FIG. 2, illustrated is a timing diagram pertaining to a "flex" data communication protocol provided in one embodiment of the multimode, multiline data transfer system of FIG. 1. The timing diagram pertains to an embodiment of the bus 140 of FIG. 1 that has four lines: a start line ("FSTART") 220, a clock line ("FCLK") 230, a data line ("FDATA") 240 and a response line ("FRESP") 250. FSTART 220 advantageously carries signals that designate the start of a "transaction" over the bus 140 and further the data communication protocol under which the bus 140 is to operate during the transaction.

The pin description of the illustrated embodiment of FSTART 220 is as follows: a rising edge denotes the start of a transaction, variable signal width is used to select the protocol that the bus is to carry, and FSTART 220 is controlled by only one bus master at a time. Of course, other embodiments fall within the broad scope of the present invention.

The pin description of the illustrated embodiment of FCLK 230 is as follows: the current bus master controls FCLK 230, FCLK 230 shuts off automatically between valid transactions, and FCLK 230 can be used to carry data when the PWM protocol is selected. Of course, other embodiments fall within the broad scope of the present invention.

The pin description of the illustrated embodiment of FDATA 240 is as follows: FDATA 240 is tri-stated, the first 16 bits contain a command from the bus master when the flex protocol is selected, application settings use two beginning pad bits, a four-bit slave address, an eight-bit user-defined field and two ending pad bits, FDATA 240 modes include configuration read, register read, register write, 16/20/24/32 bit modes, encryption and cyclic redundancy check (CRC) off, and FDATA 240 can be used to carry data when the PWM protocol is selected. Of course, other embodiments fall within the broad scope of the present invention.

The pin description of the illustrated embodiment of FRESP 250 is as follows: FRESP 250 is tri-stated, all slaves assert FRESP 250 for one clock cycle two clock cycles after an FSTART signal is asserted then thereafter used for slave communication, slaves can pull FRESP 250 high to indicate an error, and FRESP 250 can be used to carry data when the PWM protocol is selected. Of course, other embodiments fall within the broad scope of the present invention.

In FIG. 2, the data communication protocol is a flex protocol. In the illustrated embodiment, the bus master (e.g., M1) selects the flex protocol by asserting a signal over FSTART 220 that is two clock pulses, or "FLCKs," in duration. Accordingly, FIG. 2 illustrates a signal 210 to designate the start of a flex transaction. Once the bus master asserts the signal 210, the various slave bus interfaces (e.g., S2, S3 and S4) conform their operation for the flex protocol, and address, control, data and error-checking signals are transmitted over FDATA 240 and FRESP 250 in the manner shown.

In the illustrated embodiment of the flex protocol, a data transaction is performed as follows. First, FSTART asserted for two FCLKs. Then the bus master puts out a two-bit pad, a four bit address, an eight-bit command and a two-bit pad on FDATA. At the same time, the slaves signal ready/acknowledge two FCLKs after FSTART (one slave at a time, up to 12 slaves) on FRESP (as a default, two four-bit time slots are allocated for S0, then for S1, then for S2 and so on. Unused timeslots (slaves that do not signal ready) are used by the slave with next priority until all slaves are done. Then, an eight-bit CRC from master on FDATA and FRESP. Error signaling is performed with six bits plus a two-bit pad on FDATA and FRESP.

In the illustrated embodiment of the flex protocol, bus masters are changed as follows. First, FSTART asserted for two FCLKs. FDATA has two pad bits and the new bus master's four-bit address, plus an eight-bit user-defined master transfer command, plus a two-bit pad. FRESP has all bus slaves responding with ready/acknowledge two FCLK's after FSTART. FDATA has an eight-bit CRC with a seven-bit pad and a single error bit. FRESP then carries a 16-bit new master acceptance. Then, the old bus master tri-states FSTART and FCLK 32 FCLKs after FSTART. Finally, the new bus master takes over the bus.

Turning now to FIG. 3, illustrated is a timing diagram pertaining to a PCM data communication protocol provided in one embodiment of the multimode, multiline data transfer system of FIG. 1. The timing diagram again pertains to an embodiment of the bus 140 of FIG. 1 that has four lines: FSTART 320, FCLK 330, FDATA 340 and FRESP 350. FSTART 320 advantageously carries signals that designate the start of a "transaction" over the bus 140 and further the data communication protocol under which the bus 140 is to operate during the transaction. In FIG. 3, the data communication protocol is the well-known PCM protocol. Those skilled in the pertinent art understand that PCM represents an analog waveform as a stream of binary amplitude numbers.

In the illustrated embodiment, the bus master (e.g., M1) selects the PCM protocol by asserting a signal over FSTART 320 that is one FLCK in duration. Accordingly, FIG. 3 illustrates a signal 310 to designate the start of a PCM transaction. Once the bus master asserts the signal 310, the various slave bus interfaces (e.g., S2, S3 and S4) conform their operation for the PCM protocol, and address, control, data and error-checking signals are transmitted over FDATA 340 and FRESP 350 in the manner shown.

Turning now to FIG. 4, illustrated is a timing diagram pertaining to a PWM data communication protocol provided in one embodiment of the multimode, multiline data transfer system of FIG. 1. The timing diagram yet again pertains to an embodiment of the bus 140 of FIG. 1 that has four lines: FSTART 410, FCLK 420, FDATA 430 and FRESP 440. As with the previous two timing diagrams, FSTART 410 advantageously carries signals that designate the start of a "transaction" over the bus 140 and further the data communication protocol under which the bus 140 is to operate during the transaction. In FIG. 4, the data communication protocol is the well-known PWM protocol. Those skilled in the pertinent art understand that PWM represents an analog waveform as one or more binary waveforms of varying pulse width.

In contrast to FIGS. 2 and 3 in which FCLK carried a clock signal and FDATA and FRESP carried data, FCLK, FDATA and FRESP all carry data when the selected protocol is PWM. This results in three separate PWM waveforms: "PWM A," "PWM B" and "PWM C."

The bus master selects the PWM protocol by asserting an interrupt signal over FSTART 410. In the illustrated embodiment, an application program executing in the OMAP 110 of FIG. 1 generates the signal over FSTART 410. Once the bus master asserts the signal, the various slave bus interfaces conform their operation for the PCM protocol, and address, control, data and error-checking signals are transmitted over FCLK 420, FDATA 430 and FRESP 440 in the manner shown.

Figure 5:
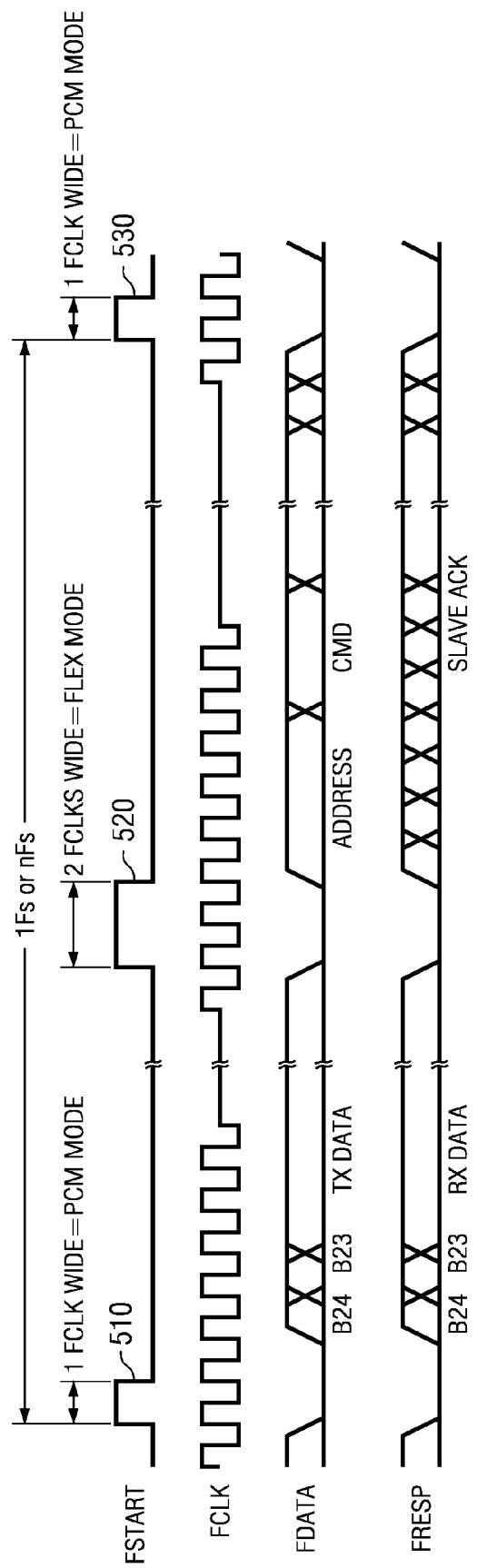
FIG. 5 illustrates a timing diagram wherein a transition occurs from the PCM data communication protocol of FIG. 3 to the flex data communication protocol of FIG. 2.

Having shown the operation of three exemplary data communication protocols over the bus 140 of FIG. 1, the operation of FSTART in selecting a particular protocol for use can now be illustrated. Accordingly, turning now to FIG. 5, illustrated is a timing diagram wherein a transition occurs from the PCM data communication protocol of FIG. 3 to the flex data communication protocol of FIG. 2. An FSTART signal 510 that is one FCLK in duration is asserted to begin a transaction in using the PCM data communication protocol. Following the transaction, an FSTART signal 520 that is two FCLKs in duration is asserted to begin a subsequent transaction using the flex data communication protocol. Thereafter, an FSTART signal 530 that is one FCLK in duration is asserted to begin a subsequent PCM transaction. Subsequent FSTART signals can be asserted to begin subsequent transactions using any protocol that the bus 140 is capable of achieving, including PWM or user-defined protocols.

Figure 6:
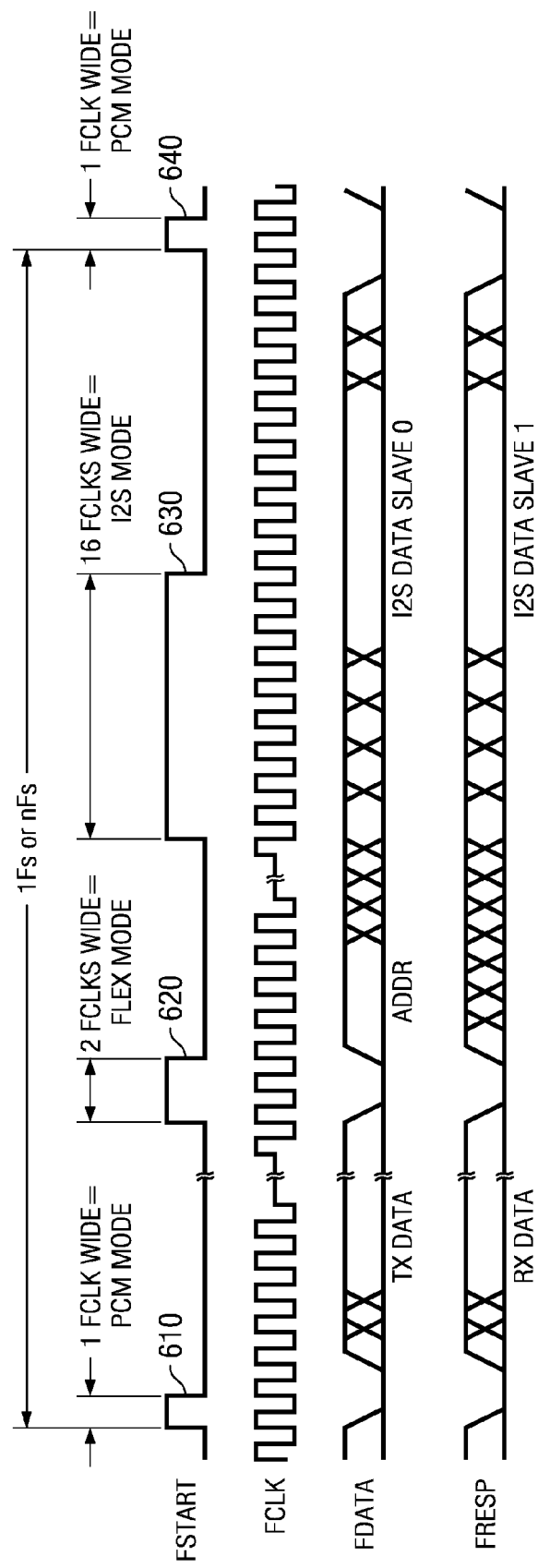
FIG. 6 illustrates a timing diagram wherein a transition occurs from the PCM data communication protocol of FIG. 3 initially to the flex data communication protocol of FIG. 2 and then to an Inter-IC (I2C) data communication protocol.

Turning now to FIG. 6, illustrated is a timing diagram wherein a transition occurs from the PCM data communication protocol of FIG. 3 initially to the flex data communication protocol of FIG. 2 and then to an I2C data communication protocol. An FSTART signal 610 that is one FCLK in duration is asserted to begin a transaction in using the PCM data communication protocol. Following the transaction, an FSTART signal 620 that is two FCLKs in duration is asserted to begin a subsequent transaction using the flex data communication protocol. Thereafter, an FSTART signal 630 that is 16 FCLKs in duration is asserted to begin a subsequent I2C transaction. Those skilled in the pertinent art are familiar with the conventional I2C data communication protocol. Thereafter, an FSTART signal 640 that is one FCLK in duration is asserted to begin a subsequent PCM transaction. As above, subsequent FSTART signals can be asserted to begin subsequent transactions using any protocol that the bus 140 is capable of achieving, including PWM or user-defined protocols.

Figure 7:
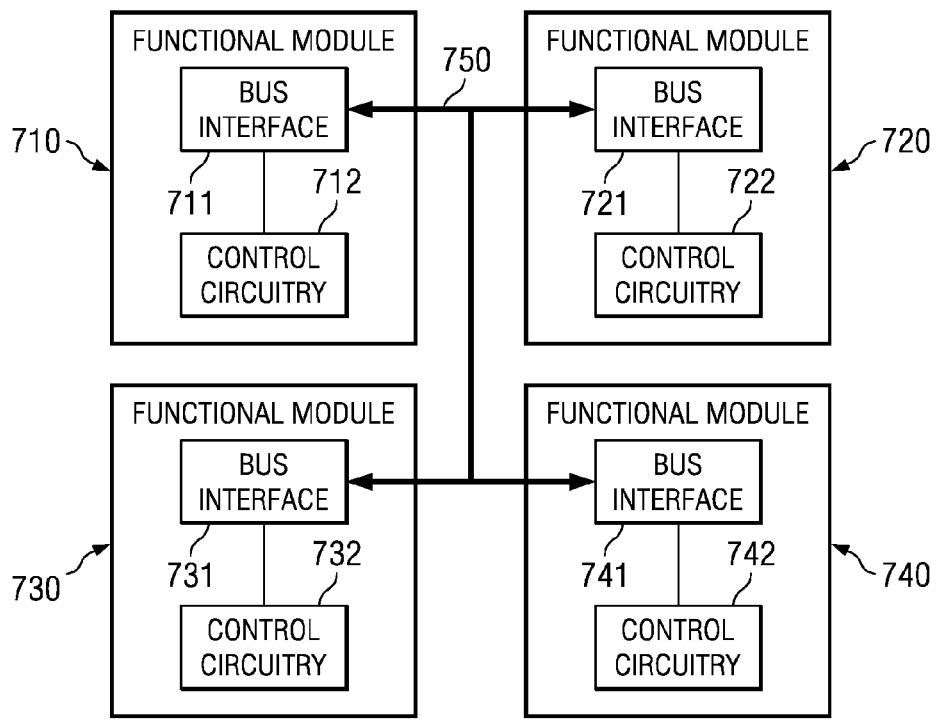
FIG. 7 illustrates a block diagram of one embodiment of a multimode, multiline data transfer system constructed according to the principles of the present invention.

Turning now to FIG. 7, illustrated is a block diagram of one embodiment of a multimode, multiline data transfer system constructed according to the principles of the present invention and coupled to a bus 750 constructed according to the principles of the present invention. A functional module 710 (e.g., the Bluetooth engine 100, the OMAP 110, the external microphone module 120 or the CME 130 of FIG. 1) contains a bus interface 711. The bus interface 711 has a start line driver, a clock line driver and a data line driver (not separately shown).

Control circuitry 712 is coupled to the bus interface 711. The control circuitry 712 is configured to cause the start line driver in the bus interface 711 to establish a selected one of plural data communication protocols over the bus. The clock line driver in the bus interface 711 is further configured to serve as a further data line driver when the selected one of the data communication protocols is based on PWM. This is in accordance with the operation disclosed in conjunction with FIG. 4.

In the illustrated embodiment, the control circuitry 712 is further configured to cause the start line driver to establish the selected one by asserting a start signal of protocol-dependent duration. As has been seen in specific embodiments disclosed herein, the FSTART signal may be an even multiple of FCLK, e.g., one FCLK for the PCM protocol, two FLCKs for the flex protocol, three FLCKs for user-defined protocols and 16 FLCKs for the I2C protocol.

Other functional modules 720, 730, 740 are coupled to the bus 750. Each of the other functional modules 720, 730, 740 has corresponding bus interfaces 721, 731, 741 and control circuitry 722, 732, 742.

Figure 8:
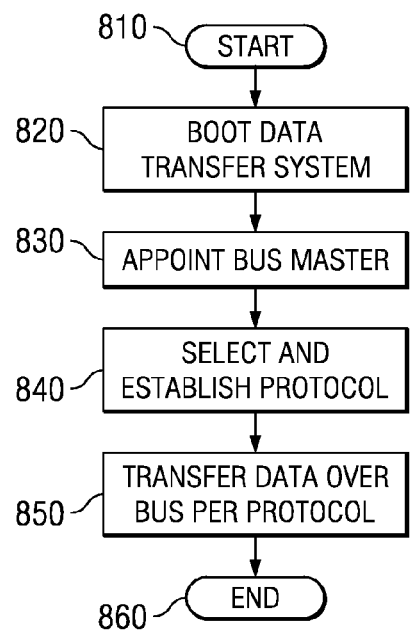
FIG. 8 illustrates a flow diagram of one embodiment of a method of operating a multimode, multiline data transfer system carried out according to the principles of the present invention.

Turning now to FIG. 8, illustrated is a flow diagram of one embodiment of a method of operating a multimode, multiline data transfer system carried out according to the principles of the present invention.

The method begins in a start step 810 wherein it is desired to transfer data from one functional module to another. The method proceeds to a step 820, wherein the data transfer system is initialized, or "booted." During boot, bus interfaces are ostensibly checked and given unique identifiers. Next, in a step 830, a bus master is appointed. The bus master is in charge of the bus until it chooses to relinquish control or is ordered to relinquish control, depending upon overall system architecture.

Then, in a step 840, the bus master establishes a selected one of plural data communication protocols over the bus. The bus master employs a start line driver of its bus interface to establish the selected protocol. Next, in a step 850, data are transferred over the bus according to the selected one. Depending upon which protocol is the selected one, the clock line of the bus may be used to carry clock signals or data.

The steps 820, 830, 840, 850 may be repeated as needed to transfer subsequent data in subsequent transactions. The method ends in an end step 860.

While the method disclosed herein has been described and shown with reference to particular steps performed in a particular order, it will be understood that these steps may be combined, subdivided, or reordered to form an equivalent method without departing from the teachings of the present invention. Accordingly, unless specifically indicated herein, the order and the grouping of the steps are not limitations of the present invention.

Although the present invention has been described in detail, those skilled in the art should understand that they can make various changes, substitutions and alterations herein without departing from the spirit and scope of the invention in its broadest form.

What is claimed is:

1. A multimode, multiline data transfer system, comprising:
   a bus interface for a bus, said bus interface having a start line driver, a clock line driver and a data line driver; and
   control circuitry coupled to said bus interface and configured to cause said start line driver to establish a selected one of plural data communication protocols over said bus based on a width of a signal on a line driven by said start line driver, said clock line driver configured to serve as a further data line driver when said selected one is based on pulse-width modulation.

2. The system as recited in claim 1 wherein said plural data communication protocols include a standard based on pulse-code modulation, Inter-IC sound, universal serial bus and a standard based on pulse-width modulation.

3. The system as recited in claim 1 wherein said plural data communication protocols include a flex protocol.

4. The system as recited in claim 1 wherein said control circuitry is further configured to cause said start line driver to establish said selected one by asserting a start signal of protocol-dependent duration.

5. The system as recited in claim 1 wherein said bus interface further has a response line driver configured to serve as another data line driver when said selected one is based on said pulse-width modulation.

6. The system as recited in claim 1 wherein said bus interface is selectably configured to operate as a master of said bus.

7. The system as recited in claim 1 wherein said plural data communication protocols include a user-defined protocol.

8. A method of operating a multimode, multiline data transfer system, comprising:
   employing a start line driver of a bus interface to establish a selected one of plural data communication protocols over a bus based on a width of a signal on a line driven by said start line driver, said bus interface further having a clock line driver and a data line driver; and
   transferring data over said bus according to said selected one, said clock line driver configured to serve as a further data line driver when said selected one is based on pulse-width modulation.

9. The method as recited in claim 8 wherein said plural data communication protocols include a standard based on pulse-code modulation, Inter-IC sound, universal serial bus and a standard based on pulse-width modulation.

10. The method as recited in claim 8 wherein said plural data communication protocols include a flex protocol.

11. The method as recited in claim 8 wherein said employing comprises asserting a start signal of protocol-dependent duration.

12. The method as recited in claim 8 wherein said bus interface further has a response line driver configured to serve as another data line driver when said selected one is based on said pulse-width modulation.

13. The method as recited in claim 8 further comprising causing said bus interface to operate as a master of said bus.

14. The method as recited in claim 8 wherein said plural data communication protocols include a user-defined protocol.

15. A multimode, multiline data transfer system, comprising:
   a bus having a start line, a clock line and a data line; and
   at least two functional blocks coupled to said bus, each of said at least two functional blocks including:
      a bus interface having a start line driver coupled to said start line, a clock line driver coupled to said clock line and a data line driver coupled to said data line, and
      control circuitry coupled to said bus interface and configured to cause said start line driver to establish a selected one of plural data communication protocols over said bus based on a width of a signal on said start line, said clock line driver configured to serve as a further data line driver when said selected one is based on pulse-width modulation.

16. The system as recited in claim 15 wherein said plural data communication protocols include a standard based on pulse-code modulation, Inter-IC sound, universal serial bus and a standard based on pulse-width modulation.

17. The system as recited in claim 15 wherein said plural data communication protocols include a flex protocol.

18. The system as recited in claim 15 wherein said control circuitry is further configured to cause said start line driver to establish said selected one by asserting a start signal of protocol-dependent duration.

19. The system as recited in claim 15 wherein said bus interface further has a response line driver configured to serve as another data line driver when said selected one is based on said pulse-width modulation.

20. The system as recited in claim 15 wherein said bus interface is selectably configured to operate as a master of said bus.

21. The system as recited in claim 15 wherein said plural data communication protocols include a user-defined protocol.

22. The system as recited in claim 15 wherein said functional blocks form a portion of a wireless communication device.

* * * * *